United States Patent
Graf et al.

(10) Patent No.: US 8,569,908 B2
(45) Date of Patent: Oct. 29, 2013

(54) HYBRID VEHICLE WITH IMMOBILIZER

(75) Inventors: Johann Graf, Hausen (DE); Martin Steinbrueck, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/641,797

(22) PCT Filed: Apr. 15, 2011

(86) PCT No.: PCT/EP2011/001922
§ 371 (c)(1),
(2), (4) Date: Jan. 2, 2013

(87) PCT Pub. No.: WO2011/128109
PCT Pub. Date: Oct. 20, 2011

(65) Prior Publication Data
US 2013/0096755 A1    Apr. 18, 2013

(30) Foreign Application Priority Data
Apr. 17, 2010   (DE) .......................... 10 2010 015 317

(51) Int. Cl.
| B60R 25/04 | (2013.01) |
| B60R 25/10 | (2013.01) |
| H01H 47/22 | (2006.01) |
| F02P 9/00  | (2006.01) |
| G08B 29/04 | (2006.01) |

(52) U.S. Cl.
USPC ... 307/10.3; 307/10.2; 307/10.6; 340/426.11; 340/426.35; 701/113

(58) Field of Classification Search
USPC .......................... 701/22, 51, 66, 93, 112, 113; 123/179.4; 340/426.11, 426.35, 5.8; 307/10.2, 10.3, 10.6
See application file for complete search history.

(56) References Cited

U.S. PATENT DOCUMENTS

| 4,331,880 | A  | * | 5/1982  | Dittman et al. ............. 290/38 R |
| 5,189,617 | A  | * | 2/1993  | Shiraishi ......................... 701/48 |
| 5,349,931 | A  | * | 9/1994  | Gottlieb et al. ............. 123/179.2 |
| 5,377,641 | A  | * | 1/1995  | Salazar ....................... 123/179.4 |
| 6,271,745 | B1 | * | 8/2001  | Anzai et al. .................. 340/5.53 |
| 7,222,006 | B2 | * | 5/2007  | Proefke et al. ............... 701/29.6 |
| 7,279,806 | B2 | * | 10/2007 | Hale et al. .................... 307/10.4 |
| 7,375,440 | B2 | * | 5/2008  | Suyama et al. .............. 307/10.2 |

(Continued)

FOREIGN PATENT DOCUMENTS

| DE | 44 29 418      | 2/1996 |
| DE | 10 2008 057 602 | 5/2009 |

(Continued)

OTHER PUBLICATIONS

International Search Report for PCT/EP2011/001922, mailed on Jul. 26, 2011.

(Continued)

*Primary Examiner* — Helal A Algahaim
*Assistant Examiner* — Thomas Ingram

(57) ABSTRACT

In a hybrid vehicle which has a plurality of drives, of which in particular one drive is a combustion engine and the other is an electric drive, all the drive control units, if appropriate even a transmission control unit, require enabling by an immobilizer control unit before the first control unit outputs control commands to communicate a torque request, input by a vehicle driver.

7 Claims, 1 Drawing Sheet

(56) References Cited

U.S. PATENT DOCUMENTS

| | | | |
|---|---|---|---|
| 8,102,249 B2* | 1/2012 | Sakamoto et al. | 340/426.11 |
| 2004/0168663 A1* | 9/2004 | Matsuura et al. | 123/179.2 |
| 2004/0262995 A1* | 12/2004 | Hawkins | 307/10.6 |
| 2005/0154511 A1* | 7/2005 | Proefke et al. | 701/30 |
| 2007/0140670 A1* | 6/2007 | DeDona et al. | 388/825 |
| 2007/0198167 A1* | 8/2007 | Dery | 701/113 |
| 2010/0030431 A1* | 2/2010 | Potter | 701/45 |
| 2010/0063675 A1* | 3/2010 | Soma et al. | 701/36 |
| 2010/0097175 A1* | 4/2010 | Kasai et al. | 340/5.8 |
| 2010/0191392 A1* | 7/2010 | Juzswik | 701/2 |
| 2010/0235026 A1* | 9/2010 | Shimizu et al. | 701/22 |
| 2012/0016558 A1* | 1/2012 | Ueno et al. | 701/51 |

FOREIGN PATENT DOCUMENTS

| | | | |
|---|---|---|---|
| DE | 102008057602 | * | 5/2009 |
| DE | 10 2010 015 317.6 | | 4/2010 |
| EP | 1 512 591 | | 3/2005 |
| EP | 1512591 | * | 9/2005 |
| EP | 2 058 197 | | 5/2009 |
| JP | 2007-246070 | | 9/2007 |
| WO | 98/22304 | | 5/1998 |
| WO | PCT/EP2011/001922 | | 4/2011 |

OTHER PUBLICATIONS

International Preliminary Report on Patentability for PCT/EP2011/001922 (5pp).

* cited by examiner

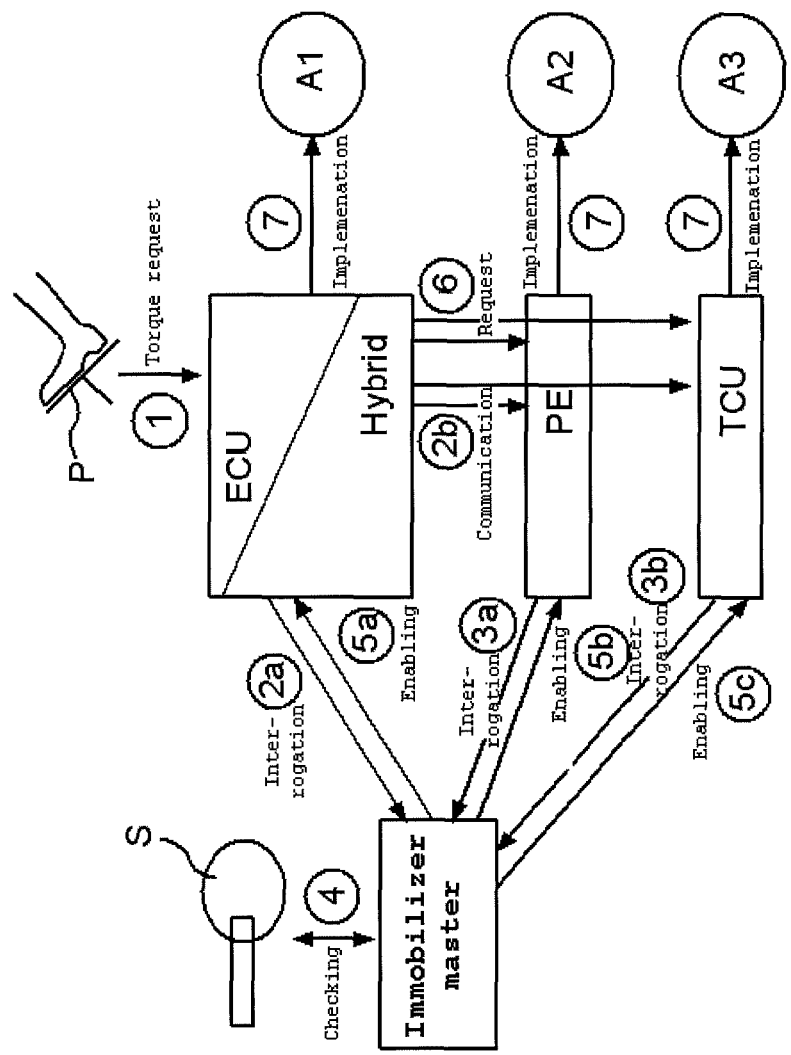

HYBRID VEHICLE WITH IMMOBILIZER

CROSS REFERENCE TO RELATED APPLICATIONS

This application is based on and hereby claims priority to International Application No. PCT/EP2011/001922 filed on Apr. 15, 2011 and German Application No. 10 2010 015 317.6 filed on Apr. 17, 2010, the contents of which are hereby incorporated by reference.

BACKGROUND

The invention relates to a method for operating the drives of a motor vehicle having at least two drives. Accordingly, for at least two of the drives an associated drive control unit for outputting control signals thereto is respectively made available. Typically there is an internal combustion engine (a combustion engine) and an electric drive and a drive control unit for the internal combustion engine as well as a drive control unit for the electric drive. If appropriate, there is also a transmission control unit for outputting control signals to a transmission by which components can be electrically actuated. One of these control units or an additional control unit functions as a master control unit. The master control unit has the function of defining which torque is to be made available by which of the drives. A specific case of this is if at least one of the drives which was previously inactive has to be activated in a predetermined situation, and the control unit then establishes this.

In a motor vehicle there is a further functionality, made available in an immobilizer control unit, by which it is ensured that only when at least one specific condition is satisfied a previously inactive drive is activated. The immobilizer control unit typically checks whether the key is inserted and turned (referred to as "terminal 15" state) or it checks an electronic identifier of the key or generally checks whether in some other way an authorization to drive the motor vehicle and therefore to operate the drives is present. The immobilizer control unit transmits what is referred to as an enable to the individual drive control units and, if appropriate, the transmission control unit. An enable can expire after a predetermined time period. The activation of the drive then occurs only when an enable is provided directly for this purpose or the last enable has occurred at least a certain time period before, in other words if the immobilizer control unit has detected the fact that at least one condition has been satisfied, that is to say in the time period which has expired last.

The concept of enabling includes the fact that the enable has to occur at the start of a drive and be maintained for as long as a specific rotational speed is present, for example in the case of an internal combustion engine a rotational speed of the crankshaft, in the case of a transmission a transmission input rotational speed and in the case of an electric motor the rotational speed of the motor.

EP 2 058 197 A1 discloses a method for operating the drives of a hybrid vehicle. Following a multi-stage authentication process in which firstly an authentication by a vehicle key or a transponder and secondly by a biometric authentication is carried out, an enable or non-enable for the activation of an internal combustion engine and/or of an electric motor of the hybrid vehicle is issued as a function of the results of the respective authentications. If the authentication by the vehicle key or the transponder and also by the biometric authentication is positive, an enable for activation is issued both for the internal combustion engine and also for the electric motor.

In the situation assumed here, according to which the motor vehicle has at least two drives, it may, however, in fact now be the case that a drive would not be activated per se for a relatively long time after the enable. The enable of the drive would then expire. For example it may be the case that the motor vehicle is moved by an electric machine, and the internal combustion engine is not activated. Activating the internal combustion engine at a significantly later time would then no longer be possible because the enable thereof has expired. The high-voltage battery in the motor vehicle would then discharge over the long term owing to the operation of the electric machine, and the power supply would not be continuously ensured. In an extreme case, the motor vehicle would even no longer be able to carry on driving.

SUMMARY

One potential object is to make available a method by which the functional capability of a motor vehicle is ensured to an increased degree with at least two drives without restrictions occurring in the case of anti-theft protection, that is to say in the immobilizer functionality.

The object is achieved by a method for operating a motor vehicle, in which an immobilizer control unit detects whether a condition has been satisfied. Satisfaction of the condition is communicated by sending a signal from the immobilizer control unit. Each of a plurality of drives of the motor vehicle is individually activating by outputting control signals from an associated drive control unit, the plurality of drives comprising an internal combustion engine. Each of the plurality of drives is individually activated only when the immobilizer control unit has detected satisfaction of the condition within a specific time period which has not yet expired. In response to a predetermined situation, a master control unit determines whether to activate each individual drive which was previously inactive, the master control unit acting as a hybrid control unit. When all drives were previously inactive, it is ensured that each of the drive control units has received the signal from the immobilizer control unit before a first of the drive control units begins to output control signals for activation. After a predetermined time period of inactivity, the internal combustion engine is briefly activated by outputting control signals from the associated drive control unit.

According to the proposals, in the predetermined situation the drive control units must thus have all received a signal from the immobilizer control unit (in a specific time period which has expired last) before the drive control units begin to output control signals for activation.

This measure ensures that even drive control units for those drives which are not activated at all receive an enable. Later activation is then possible. As a result of the fact that they can be activated later, one drive can provide the drive power in the place of another and it is possible to change over between the drives. This ensures sufficient functional reliability when the motor vehicle is driving.

It is additionally provided that, after a predetermined time period of its inactivity, a drive, and in particular an internal combustion engine as a drive, is activated for a minimum time period by the associated drive control unit.

When the method is implemented it is also possible to provide the measure according to which an enable expires after a predetermined time period of non-operation of the associated drive, wherein the operation is determined on the basis of a rotational speed. As a result of the activation of the drive for a minimum time period after a predetermined time period of its inactivity, the enable is artificially prevented from expiring because the internal combustion engine ensures a sufficient rotational speed within the time period in which its presence prevents the expiry of the enable. If the enable were to expire, for example, after a time period of 10 minutes, it would then be possible for the internal combustion engine to be activated every 9.5 minutes in order to prevent the expiry of the enable.

The already mentioned transmission control unit is preferably additionally made available in the motor vehicle for outputting control signals to a transmission, and as an additional measure there is then provision that in the predetermined situation the transmission control unit must also have received a signal from the immobilizer control unit, which signal communicates that the condition has been satisfied, and only then does the transmission control unit output control signals. The transmission control unit typically acts on a transmission which is operatively connected to the internal combustion engine, with the result that it is also desirable here that the transmission control unit has simultaneously received an enable if the transmission is required owing to the activation of the internal combustion engine.

Various mechanisms are possible for the way in which a signal can pass from the immobilizer control unit to the drive control units or, if appropriate, also to the transmission control unit. The latter preferably transmit an interrogation control signal to the immobilizer control unit in order to receive the (enable) signal.

It is, in particular, an object of the master control unit to determine the predetermined situation. In the predetermined situation, the master control unit, of course, transmits an interrogation signal to the immobilizer control unit. So that the outputting of interrogation signals and reception of enable signals is not delayed too much, the master control unit communicates to the other control units by a separate signal that it has output an interrogation signal to the immobilizer control unit, and the other control units can then also output such interrogation signals in good time.

The predetermined situation is present, in particular, if a vehicle driver makes an operator control presetting by which the vehicle driver requests, for the motor vehicle, a torque which is to be applied by the drives; this is typically the case when a gas pedal is activated. However, a torque request can also be made by a control device; an example of this is if the motor vehicle drives in an automatically controlled fashion, by example at a predetermined distance or to a vehicle traveling ahead. If the distance then increases, the motor vehicle can be accelerated, and there is correspondingly a torque request by an associated control unit.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The single FIGURE is a schematic diagram of the individual assemblies of a motor vehicle, for which assemblies the signal flow is explained below on the basis of the arrows shown in the drawing.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The proposed method begins with the fact that a vehicle driver activates a gas pedal P, as a result of which he communicates a "torque request", that is to say makes an operator control input which is intended to ensure that the drives of the motor vehicle actually apply a torque or apply a higher torque than before.

An electronic control unit (engine control unit, ECU) for a combustion engine of the motor vehicle receives this torque request.

The motor vehicle is additionally intended to have here an electric machine, for which there is a separate drive control unit ("PE" for "power electric"). There is also a third control unit which is provided for the actuation of a transmission ("TCU").

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for operating a motor vehicle, comprising:
   detecting, at an immobilizer control unit, whether a condition has been satisfied;
   communicating that the condition has been satisfied by sending a signal from the immobilizer control unit;
   individually activating each of a plurality of drives of the motor vehicle by outputting control signals from an associated drive control unit, the plurality of drives comprising an internal combustion engine, each of the plurality of drives being individually activated only when the immobilizer control unit has detected satisfaction of the condition within a specific time period which has not yet expired;
   in response to a predetermined situation, determining at a master control unit whether to activate each individual drive which was previously inactive, the master control unit acting as a hybrid control unit;
   when all drives were previously inactive, ensuring that each of the drive control units has received the signal from the immobilizer control unit before a first of the drive control units begins to output control signals for activation; and
   after a predetermined time period of inactivity less than the specific time period, briefly activating the internal combustion engine by outputting control signals from the associated drive control unit.

2. The method according to claim 1, wherein
   the motor vehicle has a transmission control unit for outputting control signals to a transmission, and
   the transmission control unit must have received the signal from the immobilizer control unit, which signal communicates that the condition has been satisfied, before the transmission control unit outputs control signals to the transmission.

3. The method according to claim 1, wherein
   each control unit must transmit an interrogation signal to the immobilizer control unit before reception of the signal from the immobilizer control unit, which signal communicates that the condition has been satisfied.

4. The method according to claim 3, wherein
in response to the predetermined situation, the master control unit outputs an interrogation signal to the immobilizer control unit, and
when the master control unit outputs the interrogation signal to the immobilizer control unit, the master control unit also communicates to the other control units, using a separate signal, that the interrogation signal has been output.

5. The method according to claim 1, wherein
the predetermined situation is present if a vehicle driver performs an operator control by which the vehicle driver requests for torque to be applied by the drives of the motor vehicle, and
the predetermined situation is present if an automatic control device requests for torque to be applied by the drives of the motor vehicle.

6. The method according to claim 1, wherein
the plurality of drives comprise the internal combustion engine and an electric motor.

7. A method for operating a motor vehicle, comprising:
detecting, at an immobilizer control unit, whether a condition has been satisfied;
communicating that the condition has been satisfied by sending a signal from the immobilizer control unit;
individually activating each of a plurality of drives of the motor vehicle by outputting control signals from an associated drive control unit, the plurality of drives comprising an internal combustion engine, each of the plurality of drives being individually activated only when the immobilizer control unit has detected satisfaction of the condition within a specific time period which has not yet expired;
in response to a predetermined situation, determining at a master control unit whether to activate each individual drive which was previously inactive, the master control unit acting as a hybrid control unit;
when all drives were previously inactive, ensuring that each of the drive control units has received the signal from the immobilizer control unit before a first of the drive control units begins to output control signals for activation; and
after a predetermined time period of inactivity, briefly activating the internal combustion engine by outputting control signals from the associated drive control unit;
wherein the drive control unit for the internal combustion engine also serves as the master control unit,
each control unit must transmit an interrogation signal to the immobilizer control unit before reception of the signal from the immobilizer control unit, which signal communicates that the condition has been satisfied, thereby permitting the associated drive to be activated, and
ensuring that each of the drive control units has received the signal from the immobilizer control unit before a first of the drive control units begins to output control signals for activation, comprises:
when the master control unit outputs the interrogation signal to the immobilizer control unit, the master control unit also communicates to the other control units, using a separate signal, that the interrogation signal has been output; and
upon receiving the separate signal from the master control unit, the other drive control units each transmit an interrogation signal to the immobilizer control unit.

* * * * *